US008724135B2

(12) United States Patent
Misumi

(10) Patent No.: US 8,724,135 B2
(45) Date of Patent: May 13, 2014

(54) PRINTING DEVICE AND METHOD OF CONTROLLING THE SAME

(75) Inventor: Kazuhito Misumi, Konan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 50 days.

(21) Appl. No.: 13/420,473

(22) Filed: Mar. 14, 2012

(65) Prior Publication Data

US 2013/0070279 A1    Mar. 21, 2013

(30) Foreign Application Priority Data

Sep. 15, 2011 (JP) ................................. 2011-201721

(51) Int. Cl.
*G06K 15/00* (2006.01)
*H04L 9/32* (2006.01)

(52) U.S. Cl.
USPC .......... 358/1.14; 713/168; 713/169; 713/172; 713/176

(58) Field of Classification Search
CPC ...... G06F 21/44; G06F 21/84; G06K 15/4095
See application file for complete search history.

(56) References Cited

U.S. PATENT DOCUMENTS

| | | | |
|---|---|---|---|
| 7,314,263 B2 * | 1/2008 | Hayasaki et al. | 347/19 |
| 2002/0180851 A1 * | 12/2002 | Saruta | 347/86 |
| 2003/0198349 A1 | 10/2003 | Aizu et al. | |
| 2004/0181681 A1 * | 9/2004 | Salisbury | 713/200 |
| 2005/0206672 A1 * | 9/2005 | Adkins et al. | 347/19 |
| 2006/0140647 A1 * | 6/2006 | Adkins et al. | 399/12 |
| 2007/0160204 A1 * | 7/2007 | Kimura et al. | 380/46 |
| 2009/0175632 A1 | 7/2009 | Kim | |
| 2011/0078449 A1 * | 3/2011 | Starr et al. | 713/176 |
| 2011/0109938 A1 * | 5/2011 | Refstrup | 358/1.15 |
| 2011/0211850 A1 | 9/2011 | Kim | |

FOREIGN PATENT DOCUMENTS

| | | |
|---|---|---|
| JP | H06-339036 A | 12/1994 |
| JP | H10-164656 A | 6/1998 |
| JP | 2001-134672 A | 5/2001 |
| JP | 2004-007567 A | 1/2004 |
| JP | 2006-121545 A | 5/2006 |
| JP | 2009-014991 A | 1/2009 |
| JP | 2009-163208 A | 7/2009 |

* cited by examiner

*Primary Examiner* — Vincent Rudolph
*Assistant Examiner* — Moustapha Diaby
(74) *Attorney, Agent, or Firm* — Merchant & Gould P.C.

(57) ABSTRACT

A first memory section stores secret keys that are identical to secret keys stored in a cartridge. A second memory section stores history information relating to a history of usage. A secret-key selecting section performs a secret-key selecting operation of selecting, based on the history information, a specific secret key from among the secret keys. A first-authentication-information generating section encrypts a random number based on the specific secret key, thereby generating first authentication information, which is stored in a third memory section. A transmitting section transmits first identification information for identifying the specific secret key and the random number to the cartridge. A receiving section receives second authentication information generated at the cartridge by encrypting the random number based on a secret key identified by the first identification information. An authenticating section compares the first and second authentication information, and authenticates the cartridge if the both authentication information match.

19 Claims, 9 Drawing Sheets

FIG. 7

| | INFORMATION TYPE | DATA CONTENT |
|---|---|---|
| 111C | CARTRIDGE IDENTIFYING INFORMATION (CYAN) | aaaaaaaa |
| 111M | CARTRIDGE IDENTIFYING INFORMATION (MAGENTA) | bbbbbbbb |
| 111Y | CARTRIDGE IDENTIFYING INFORMATION (YELLOW) | cccccccc |
| 111K | CARTRIDGE IDENTIFYING INFORMATION (BLACK) | dddddddd |
| 112C | USAGE SECRET KEY (CYAN) | FIRST SECRET KEY K1 |
| 112M | USAGE SECRET KEY (MAGENTA) | FIRST SECRET KEY K1 |
| 112Y | USAGE SECRET KEY (YELLOW) | FIRST SECRET KEY K1 |
| 112K | USAGE SECRET KEY (BLACK) | FIRST SECRET KEY K1 |
| 113C | INK-REMAINING-AMOUNT INFORMATION (CYAN) | R1 |
| 113M | INK-REMAINING-AMOUNT INFORMATION (MAGENTA) | R2 |
| 113Y | INK-REMAINING-AMOUNT INFORMATION (YELLOW) | R3 |
| 113K | INK-REMAINING-AMOUNT INFORMATION (BLACK) | R4 |
| 121C | NUMBER OF TIMES OF MOUNTING CARTRIDGE (CYAN) | 20 |
| 121M | NUMBER OF TIMES OF MOUNTING CARTRIDGE (MAGENTA) | 15 |
| 121Y | NUMBER OF TIMES OF MOUNTING CARTRIDGE (YELLOW) | 18 |
| 121K | NUMBER OF TIMES OF MOUNTING CARTRIDGE (BLACK) | 25 |
| 122 | NUMBER OF TIMES OF CLEANING | 475 |
| 123 | CUMULATIVE NUMBER OF PRINTED SHEETS | 3150 |
| 124 | CUMULATIVE POWER-ON PERIOD (H) | 220 |

| USAGE SECRET KEY | CLEANING NUMBER-OF-TIME THRESHOLDS (TIMES) | |
|---|---|---|
| FIRST SECRET KEY K1 | 0 TO 500 | 301 |
| SECOND SECRET KEY K2 | 501 TO 1000 | 302 |
| THIRD SECRET KEY K3 | 1001 TO 1500 | 303 |
| FOURTH SECRET KEY K4 | 1501 OR MORE | 304 |

| | INFORMATION TYPE | DATA CONTENT |
|---|---|---|
| 211C | CARTRIDGE IDENTIFYING INFORMATION | aaaaaaaa |
| 212C | CARTRIDGE COLOR INFORMATION | CYAN |
| 213C | INK-REMAINING-AMOUNT INFORMATION | R1 |

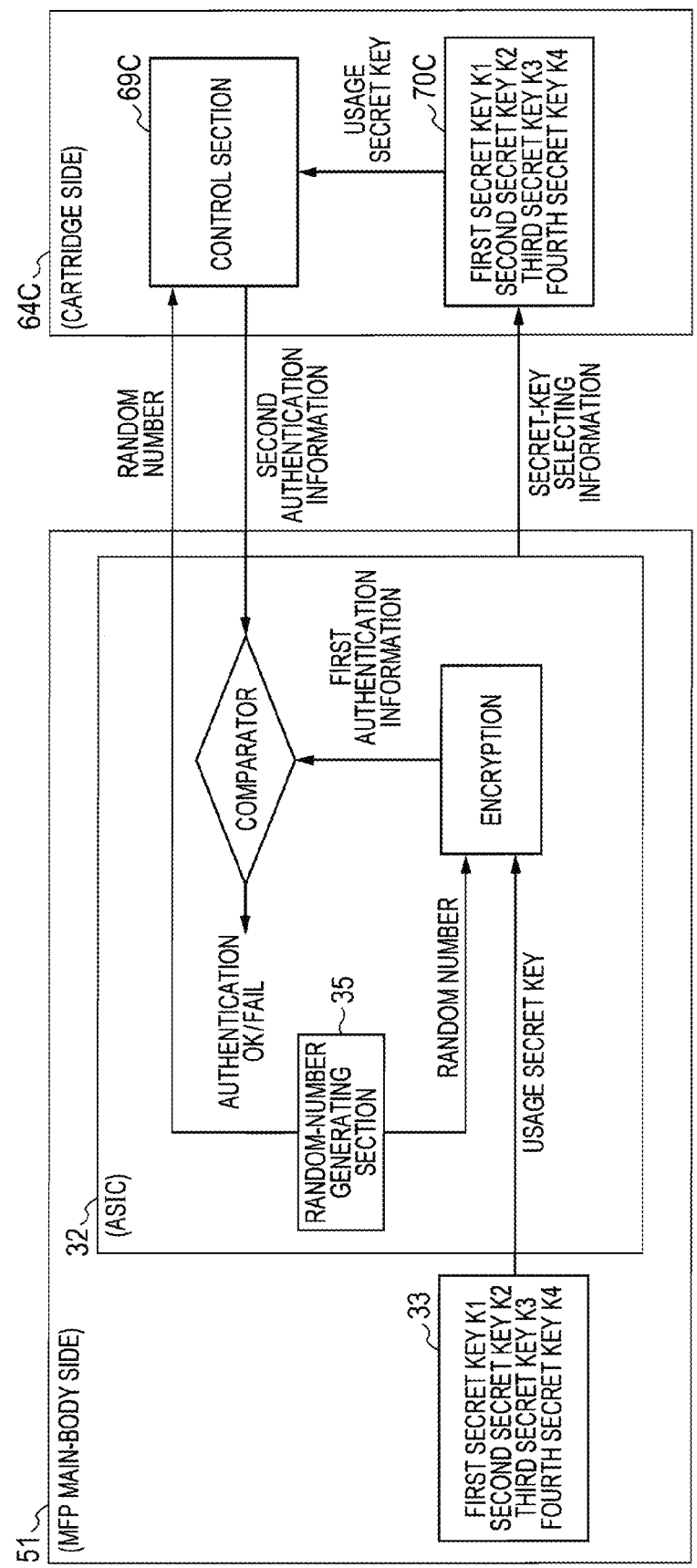

| USAGE SECRET KEY | CUMULATIVE-NUMBER-OF-PRINTED-SHEET THRESHOLDS (NUMBER OF SHEETS) | |
|---|---|---|
| FIRST SECRET KEY K1 | 0 TO 1000 | ~301a |
| SECOND SECRET KEY K2 | 1001 TO 2000 | ~302a |
| THIRD SECRET KEY K3 | 2001 TO 3000 | ~303a |
| FOURTH SECRET KEY K4 | 3001 OR MORE | ~304a |

| USAGE SECRET KEY | CUMULATIVE-POWER-ON-PERIOD THRESHOLDS (H) | |
|---|---|---|
| FIRST SECRET KEY K1 | 0 TO 3000 | ~301b |
| SECOND SECRET KEY K2 | 3001 TO 6000 | ~302b |
| THIRD SECRET KEY K3 | 6001 TO 9000 | ~303b |
| FOURTH SECRET KEY K4 | 9001 OR MORE | ~304b |

| USAGE SECRET KEY | NUMBER-OF-TIME-OF-MOUNTING-CARTRIDGE THRESHOLDS (TIMES) | |
|---|---|---|
| FIRST SECRET KEY K1 | 0 TO 10 | ~301c |
| SECOND SECRET KEY K2 | 11 TO 20 | ~302c |
| THIRD SECRET KEY K3 | 21 TO 30 | ~303c |
| FOURTH SECRET KEY K4 | 31 OR MORE | ~304c |

PRINTING DEVICE AND METHOD OF CONTROLLING THE SAME

CROSS REFERENCE TO RELATED APPLICATIONS

This application claims priority from Japanese Patent Application No. 2011-201721 filed Sep. 15, 2011. The entire content of the priority application is incorporated herein by reference.

TECHNICAL FIELD

The invention relates to a printing device and a method of controlling a printing device.

BACKGROUND

A technology is conventionally known that compares authentication information stored in a printer with authentication information stored in a storage element (for example, an IC chip) provided to a cartridge, thereby determining whether the cartridge mounted on the printer is a regular cartridge which is manufactured by a regular supplier or a compatible cartridge which is manufactured by other suppliers.

SUMMARY

In an authentication process, if a compatible cartridge other than a regular cartridge is recognized as a regular cartridge, there is a possibility that appropriate print quality is not obtained or that a function of preventing failure etc. of the printer does not work in a normal way.

In view of the foregoing, it is an object of the invention to provide a printing device and a method of controlling a printing device that overcome these inconveniences.

In order to attain the above and other objects, the invention provides a printing device. The printing device includes at least one mount section, a printing section, a first memory section, a second memory section, a secret-key selecting section, a first-authentication-information generating section, a third memory section, a transmitting section, a receiving section, and an authenticating section. A cartridge storing a plurality of secret keys is configured to be detachably mounted on the at least one mount section. The printing section is configured to perform printing on a recording medium with developer accommodated in the cartridge. The first memory section is configured to store a plurality of secret keys that is identical to the plurality of secret keys stored in the cartridge. The second memory section is configured to store history information relating to a history of usage of the printing device. The secret-key selecting section is configured to perform a secret-key selecting operation of selecting, based on the history information, a specific secret key from among the plurality of secret keys stored in the first memory section. The first-authentication-information generating section is configured to encrypt a random number based on the selected specific secret key, thereby generating first authentication information. The third memory section is configured to store the first authentication information. The transmitting section is configured to transmit first identification information and the random number to the cartridge. The first identification information is information for identifying the specific secret key. The receiving section is configured to receive second authentication information from the cartridge. The second authentication information is generated at the cartridge by encrypting the random number transmitted by the transmitting section based on a secret key identified by the first identification information. The authenticating section is configured to compare the first authentication information stored in the third memory section with the second authentication information received by the receiving section, and to authenticate the cartridge if the first authentication information matches the second authentication information.

According to another aspect, the invention also provides a method of controlling a printing device including at least one mount section on which a cartridge storing a plurality of secret keys is configured to be detachably mounted, a printing section configured to perform printing on a recording medium with developer accommodated in the cartridge, and a first memory section storing a plurality of secret keys that is identical to the plurality of secret keys stored in the cartridge. The method includes: storing history information in a second memory section, the history information relating to a history of usage of a printing device; performing a secret-key selecting operation of selecting, based on the history information, a specific secret key from among the plurality of secret keys stored in the first memory section; encrypting a random number based on the selected specific secret key, thereby generating first authentication information; storing the first authentication information in a third memory section; transmitting first identification information and the random number to the cartridge, the first identification information being information for identifying the specific secret key; receiving second authentication information from the cartridge, the second authentication information being generated at the cartridge by encrypting the random number transmitted in the transmitting step based on a secret key identified by the first identification information; and comparing the first authentication information stored in the third memory section with the second authentication information received in the receiving step, and authenticating the cartridge if the first authentication information matches the second authentication information.

According to still another aspect, the invention also provides a printing device. The printing device includes at least one mount section, a printing section, a first memory section, a second memory section, a third memory section, and a processor. A cartridge storing a plurality of secret keys is configured to be detachably mounted on the at least one mount section. The printing section is configured to perform printing on a recording medium with developer accommodated in the cartridge. The first memory section is configured to store a plurality of secret keys that is identical to the plurality of secret keys stored in the cartridge. The second memory section configured to store history information relating to a history of usage of the printing device. The third memory section is configured to store first authentication information. The processor is configured to perform a secret-key selecting operation of selecting, based on the history information, a specific secret key from among the plurality of secret keys stored in the first memory section; to encrypt a random number based on the selected specific secret key, thereby generating the first authentication information; to transmit first identification information and the random number to the cartridge, the first identification information being information for identifying the specific secret key; to receive second authentication information from the cartridge, the second authentication information being generated at the cartridge by encrypting the transmitted random number based on a secret key identified by the transmitted first identification information; to compare the first authentication information stored in the third memory section with the second authentication information received from the cartridge; and to authenticate the cartridge if the first authentication information matches the second authentication information.

BRIEF DESCRIPTION OF THE DRAWINGS

Embodiments in accordance with the invention will be described in detail with reference to the following figures wherein:

FIG. 7 is an explanatory diagram showing an example of an MFP memory table;

FIG. 8 is an explanatory diagram showing an example of a secret-key table;

FIG. 9 is an explanatory diagram showing an example of a cartridge memory table;

FIG. 10 is an explanatory diagram showing operations of challenge-response authentication;

FIG. 11 is an explanatory diagram showing another example of the secret-key table;

FIG. 12 is an explanatory diagram showing still another example of the secret-key table; and FIG. 13 is an explanatory diagram showing still another example of the secret-key table.

DETAILED DESCRIPTION

Configuration of MFP

An MFP embodying a printing device according to an embodiment of the invention will be described while referring to FIGS. 1 through 10.

Figure 1:
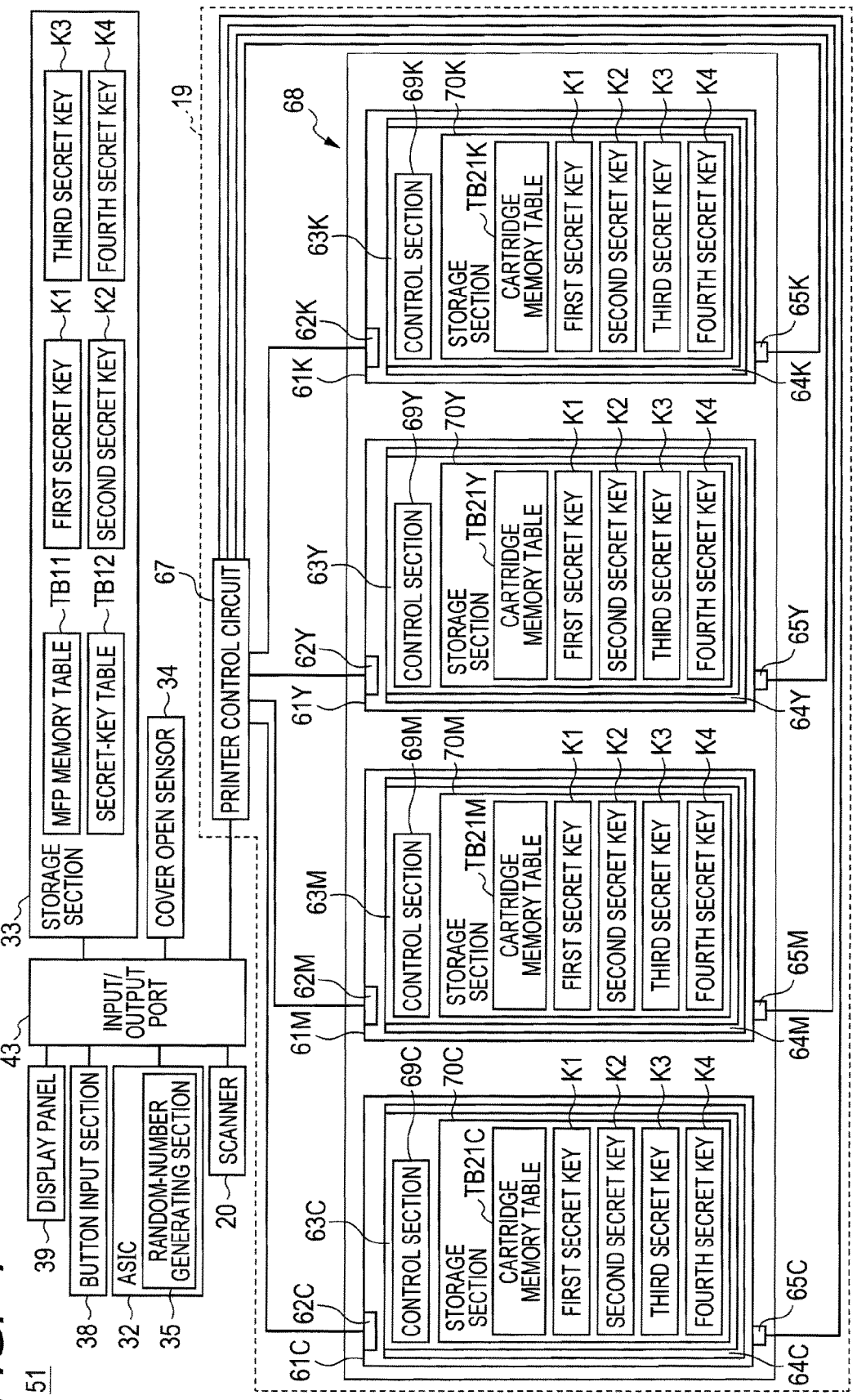
FIG. 1 is a block diagram of a multifunction peripheral (MFP) according to an embodiment of the invention.

FIG. 1 shows a block diagram of an MFP (Multifunction Peripheral) 51. The MFP 51 mainly includes an ASIC (Application Specific Integrated Circuit) 32, a storage section 33, a cover open sensor 34, a button input section 38, a display panel 39, a printer 19, and a scanner 20. These elements are configured to communicate with one another via an input/output port 43. The ASIC 32 is an integrated circuit for executing various processes described later. The ASIC 32 includes a random-number generating section 35. The cover open sensor 34 is a sensor for detecting opening/closing of a main-body cover (not shown) of the MFP 51. The button input section 38 is keys for performing each function of the MFP 51. The display panel 39 displays various functioning information of the MFP 51. The scanner 20 performs scanning.

The printer 19 performs printing. The printer 19 includes a printer control circuit 67 and a carriage 68. As schematically shown in FIG. 1, the carriage 68 includes insertion openings 61C, 61M, 61Y, and 61K. The insertion openings 61C, 61M, 61Y, and 61K correspond to colors of cyan (C), magenta (M), yellow (Y), and black (K), respectively. Cartridges 64C, 64M, 64Y, and 64K are detachably mounted on the insertion openings 61C, 61M, 61Y, and 61K, respectively. The cartridges 64C, 64M, 64Y, and 64K accommodate ink in colors of cyan (C), magenta (M), yellow (Y), and black (K), respectively. The printer control circuit 67 controls communications with IC chips 63C, 63M, 63Y, and 63K provided at the cartridges 64C, 64M, 64Y, and 64K mounted on the insertion openings 61C, 61M, 61Y, and 61K, respectively. The carriage 68 is disposed inside the main-body cover (not shown) of the MFP 51. Hence, the main-body cover needs to be opened/closed when the cartridge 64C etc. are replaced.

The configuration of the cartridges will be described, taking the cartridge 64C as an example. The cartridge 64C includes the IC chip 63C. The IC chip 63C includes a control section 69C and a storage section 70C. The control section 69C controls a process of encrypting a random number and a communication process with the printer control circuit 67. The storage section 70C stores a cartridge memory table TB21C and first secret key K1 through fourth secret key K4. The first secret key K1 through the fourth secret key K4 are stored preliminarily by a manufacturer of the cartridge 64C.

FIG. 9 shows an example of the cartridge memory table TB21C. The cartridge memory table TB21C stores cartridge identifying information 211C, cartridge color information 212C, and ink-remaining-amount information 213C. The cartridge identifying information 211C is information for identifying the cartridge 64C. An example of the cartridge identifying information 211C includes a manufacture serial number. The cartridge color information 212C is information for indicating color (cyan) of ink accommodated in the cartridge. The ink-remaining-amount information 213C is information relating to a remaining amount of ink accommodated in the cartridge 64C. Note that, because each configuration of the cartridges 64M, 64Y, and 64K is similar to that of the cartridge 64C, detailed descriptions are omitted.

The configuration of the insertion openings will be described, taking the insertion opening 61C as an example. An electrode 62C is provided at the insertion opening 61C for connection with the IC chip of the cartridge. When the cartridge 64C is properly mounted on the insertion opening 61C, a pad (not shown) on the IC chip 63C is in contact with the electrode 62C, enabling communication between the printer control circuit 67 and the IC chip 63C. Further, a mount sensor 65C is provided at the insertion opening 61C. The mount sensor 65C is a sensor for detecting dismounting and mounting of the cartridge from/on the insertion opening 61C. Each of the electrode 62C and the mount sensor 65C is connected with the printer control circuit 67 via a cable. Note that, because each configuration of the insertion openings 61M, 61Y, and 61K is similar to that of the insertion opening 61C, detailed descriptions are omitted.

The storage section 33 includes a RAM (Random Access Memory), a ROM (Read Only Memory), a flash memory, a HDD (Hard Disk Drive), and the like, all of which constitute the storage section in combination. The storage section 33 stores an MFP memory table TB11, a secret-key table TB12, and the first secret key K1 through the fourth secret key K4.

FIG. 7 shows an example of the MFP memory table TB11. The MFP memory table TB11 stores cartridge identifying information 111C through 111K, usage secret keys 112C through 112K, ink-remaining-amount information 113C through 113K, and history information 120. The cartridge identifying information 111C through 111K are areas for storing the cartridge identifying information 211C through 211K that are read out from the cartridge 64C through 64K, respectively. The usage secret keys 112C through 112K are secret keys that are used to authenticate the cartridge 64C through 64K, respectively. The ink-remaining-amount information 113C through 113K are areas for storing ink-remaining-amount information 213C through 213K that are read out from the cartridge 64C through 64K, respectively.

The history information 120 is information relating to a history of usage of the MFP 51. The history information 120 includes numbers of times of mounting cartridge 121C through 121K, a number of times of cleaning 122, a cumulative number of printed sheets 123, and a cumulative power-on period 124. Each of the numbers of times of mounting cartridge 121C through 121K is a cumulative value of the number of times the cartridge is mounted on a corresponding one of the insertion openings 61C through 61K. The number of times of cleaning 122 is a cumulative value of the number of times cleaning is performed at ink nozzles provided at a head section (not shown). The cumulative number of printed sheets 123 is a cumulative value of the number of times printing is performed by the MFP 51. The cumulative power-on period 124 is a cumulative value of a period during which power of the MFP 51 is on.

FIG. 8 shows an example of the secret-key table TB12. The secret-key table TB12 is a table for indicating relationship between cleaning number-of-time thresholds 301 through 304 and the first secret key K1 through the fourth secret key K4. With the secret-key table TB12, the usage secret key can be determined based on which range of the cleaning number-of-time thresholds 301 through 304 the number of times of cleaning 122 of the head section falls within. For example, the first secret key K1 is selected as the usage secret key if the number of times of cleaning 122 is 500 times, and the second secret key K2 is selected as the usage secret key if the number of times of cleaning 122 is 501 times. In the present embodiment, the cleaning number-of-time thresholds 301 through 304 are preliminarily stored in the secret-key table TB12.

In the present embodiment, each of the cartridges 64C, 64M, 64Y, and 64K preliminarily stores the first secret key K1 through the fourth secret key K4. Further, the storage section 33 of the MFP 51 preliminarily stores the first secret key K1 through the fourth secret key K4. The first secret key K1 through the fourth secret key K4 stored in each of the cartridges 64C, 64M, 64Y, and 64K are identical to the first secret key K1 through the fourth secret key K4 stored in the storage section 33 of the MFP 51. Thus, challenge-response authentication described later can be executed. The challenge-response authentication is a technique for determining whether the cartridges 64C, 64M, 64Y, and 64K are regular cartridges that are manufactured by a regular supplier.

The operations of the MFP 51 will be described with reference to the flowcharts of FIGS. 2 through 6. The flowcharts of FIGS. 2 through 6 are constantly executed while the power of the MFP 51 is in an on state.

Cartridge Replacement Process (MFP)

Figure 2:
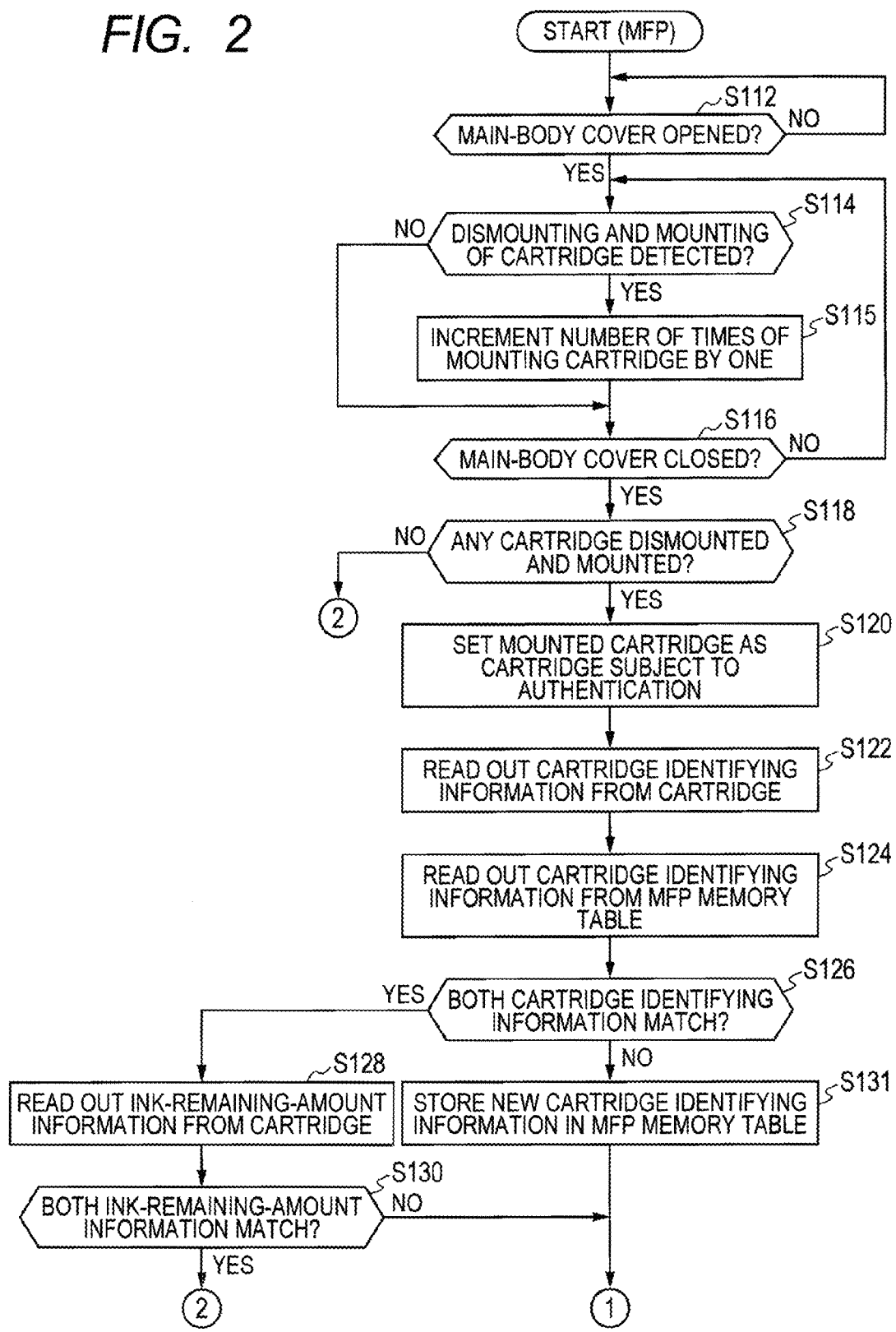
FIG. 2 is a flowchart showing part of processes executed by the MFP when a cartridge is replaced.
Figure 3:
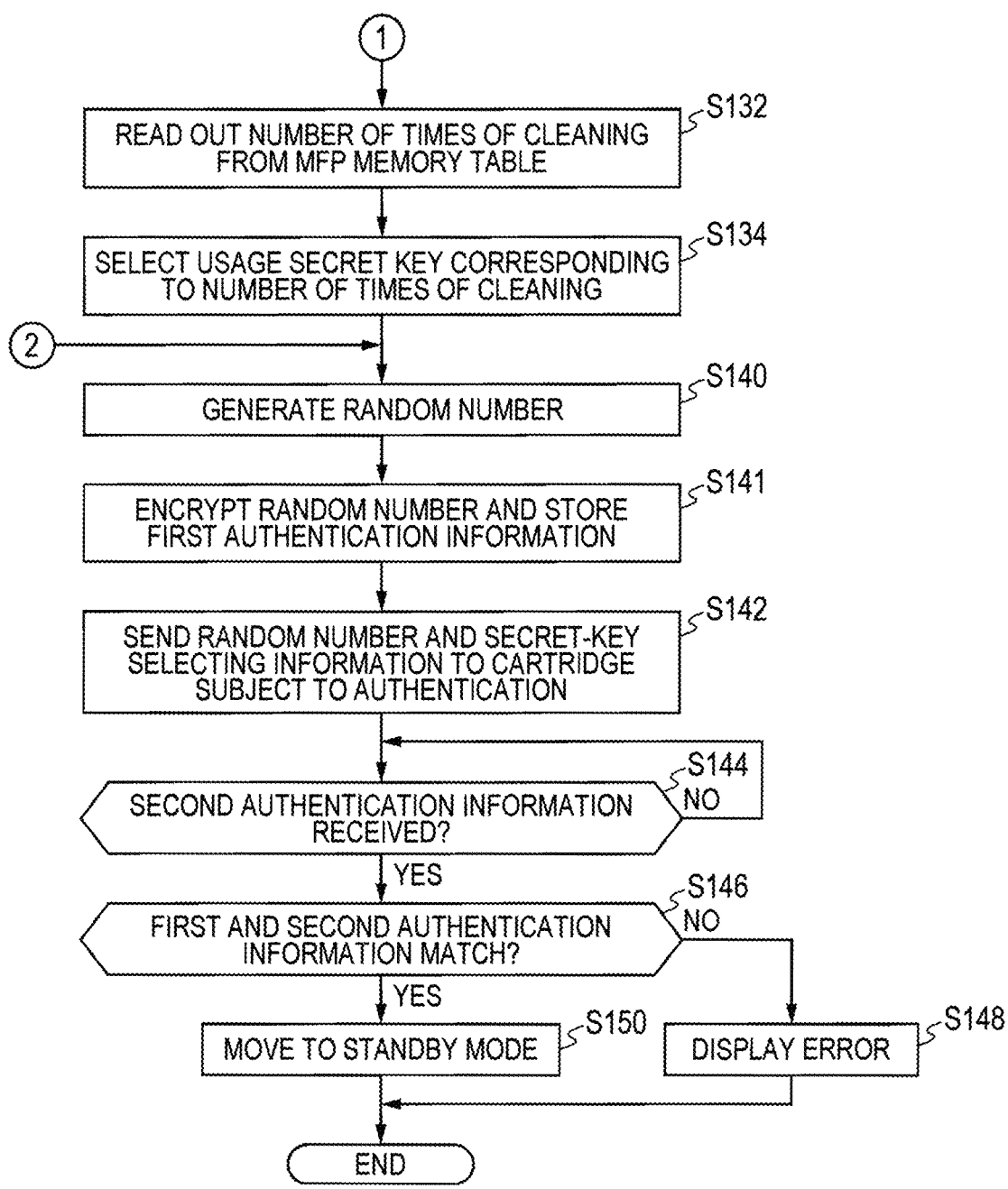
FIG. 3 is a flowchart showing a remaining part of the processes executed by the MFP when the cartridge is replaced.

Processes executed by the MFP 51 at the time of replacement of any one of the cartridges 64C, 64M, 64Y, and 64K will be described with reference to the flowchart of FIGS. 2 and 3. In S112, the ASIC 32 determines whether the main-body cover of the MFP 51 is opened. This determination is performed by monitoring detection results of the cover open sensor 34. The ASIC 32 returns to S112 if the main-body cover is not opened (S112: No), and proceeds to S114 if the main-body cover is opened (S112: Yes). In S114, the ASIC 32 determines whether the mount sensors 65C, 65M, 65Y, and 65K detect dismounting and mounting of a cartridge. The ASIC 32 proceeds to S116 if dismounting and mounting are not detected (S114: No), and proceeds to S115 if dismounting and mounting are detected (S114: Yes). In S115, the ASIC 32 increments, by one (1), the one of the numbers of times of mounting cartridge 121C, 121M, 121Y, and 121K of the MFP memory table TB11 for a cartridge for which dismounting and mounting is detected. In S116, the ASIC 32 determines whether the main-body cover of the MFP 51 is closed. The ASIC 32 returns to S114 if the main-body cover is not closed (S116: No), and proceeds to S118 if the main-body cover is closed (S116: Yes).

In S118, the ASIC 32 determines whether at least one of the cartridges 64C, 64M, 64Y, and 64K is dismounted and mounted. This determination is performed based on update conditions of the numbers of times of mounting cartridge 121C through 121K. The ASIC 32 proceeds to S140 if none of the cartridges is dismounted and mounted (for example, a case in which the main-body cover is merely opened and closed) (S118: No), and proceeds to S120 if at least one cartridge is dismounted and mounted (S118: Yes).

In S120, the ASIC 32 sets the mounted cartridge as a cartridge subject to authentication. The cartridge subject to authentication is a cartridge that is a subject of an authentication process described later. In an example of the present embodiment, for simplicity, a case will be described below in which the cartridge 64C is set as the cartridge subject to authentication. Note that processes in cases where the cartridges 64M, 64Y, and 64K are set as the cartridge subject to authentication are similar to processes in the case where the cartridge 64C is set as the cartridge subject to authentication. Hence, descriptions for those cases will be omitted.

In S122, the ASIC 32 reads out, from the cartridge 64C, the cartridge identifying information 211C of the cartridge subject to authentication (the cartridge 64C) after mounting. The cartridge identifying information 211C is identifying information of the cartridge that is currently mounted. In S124, the ASIC 32 reads out, from the MFP memory table TB11, the cartridge identifying information 111C of the cartridge subject to authentication (the cartridge 64C) prior to dismounting. The cartridge identifying information 111C is identifying information of the cartridge that is previously mounted.

In S126, the ASIC 32 determines whether the cartridge identifying information 211C acquired in S122 matches the cartridge identifying information 111C acquired in S124. If the both identifying information do not match (S126: No), the ASIC 32 determines that the cartridge 64C is replaced by dismounting and mounting operations and proceeds to S131. In S131, the ASIC 32 stores the cartridge identifying information 211C read out in S122 in the MFP memory table TB11 as a new cartridge identifying information 111C (that is, the ASIC 32 overwrites the existing cartridge identifying information 111C). The ASIC 32 then proceeds to S132 (FIG. 3) in order to execute a process for selecting a secret key.

If the both identifying information match (S126: Yes), it is determined that, after the cartridge 64C is dismounted from the insertion opening 61C, the dismounted cartridge 64C is again mounted on the insertion opening 61C (that is, the cartridge 64C is not replaced). The ASIC 32 thus proceeds to S128 and reads out the ink-remaining-amount information 213C from the cartridge 64C.

In S130, the ASIC 32 determines whether the ink-remaining-amount information 113C read out from the MFP memory table TB11 (a remaining amount of ink in the cartridge that is previously mounted) matches the ink-remaining-amount information 213C read out from the cartridge 64C in S128 (a remaining amount of ink in the cartridge that is currently mounted). If both ink-remaining-amount information do not match (S130: No), it is determined that there is a possibility that this cartridge 64C has been used on another printing device. Thus, it is determined that the process of selecting a secret key (S132 and S134) should be executed, and the ASIC 32 proceeds to S132 (FIG. 3). If both ink-remaining-amount information match (S130: Yes), the ASIC 32 skips the process of selecting a secret key (S132 and S134) and proceeds to S140 (FIG. 3).

In S132 (FIG. 3), the ASIC 32 reads out the number of times of cleaning 122 from the MFP memory table TB11. In S134, the ASIC 32 selects the usage secret key (specific secret key) corresponding to the read-out number of times of cleaning 122, in accordance with the secret-key table TB12. Specifically, the ASIC 32 determines which range of the cleaning number-of-time thresholds 301 through 304 the number of times of cleaning 122 falls within. (Here, if the number of times of cleaning 122 exceeds at least one threshold, a different usage secret key is selected.) The ASIC 32 then stores the selected secret key in the MFP memory table TB11 as the usage secret key 112C (that is, the ASIC 32 overwrites the previous usage secret key 112C).

In S140 through S146, challenge-response authentication is performed. The challenge-response authentication in the present embodiment will be described with reference to FIG. 10. In an example of FIG. 10, for simplicity, a case will be described in which the first secret key K1 is used as a key used for authentication (usage secret key). In S140, the ASIC 32 generates a random number in the random-number generating section 35. In S141, the ASIC 32 reads out the usage secret key 112C (the first secret key K1) from the storage section 33. The ASIC 32 then encrypts the generated random number using the usage secret key 112C to obtain first authentication information, and temporarily stores the first authentication information in the storage section 33.

In S142, the ASIC 32 transmits the generated random number and secret-key selecting information to the cartridge subject to authentication (the cartridge 64C). The secret-key selecting information is information for informing the cartridge 64C of which secret key is to be selected as the usage secret key, among the first secret key K1 through the fourth secret key K4 that are commonly stored both in the storage section 33 of the MFP 51 and in the storage section 70C of the cartridge 64C.

Process at Cartridge

Figure 4:
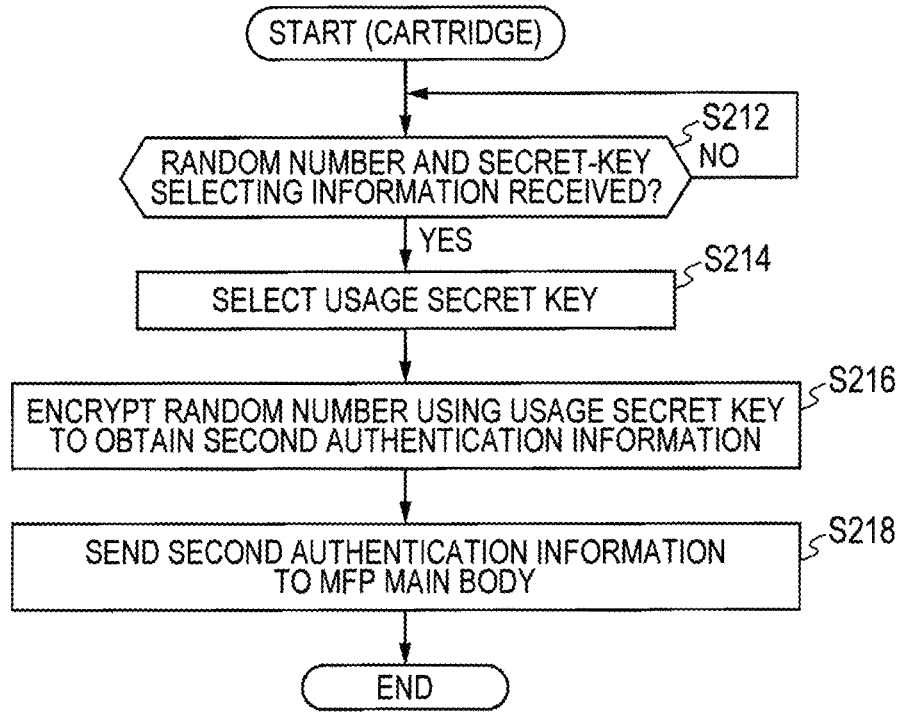
FIG. 4 is a flowchart showing processes executed at the cartridge when the cartridge is replaced.

Processes executed by the cartridge 64C will be described with reference to the flowchart of FIG. 4. In S212, the control section 69C determines whether the random number and the secret-key selecting information are received from the main body of the MFP 51. The control section 69C returns to S212 if the random number and the secret-key selecting information are not received (S212: No), and proceeds to S214 if the random number and the secret-key selecting information are received (S212: Yes). In S214, the control section 69C selects the usage secret key (the first secret key K1) based on the secret-key selecting information. In S216, the control section 69C encrypts the received random number using the usage secret key (the first secret key K1) to obtain second authentication information. In S218, the control section 69C transmits the second authentication information to the main body of the MFP 51. Then, the processes at the cartridge 64C are finished.

Returning to the processes executed by the MFP 51, in S144 (FIG. 3), the ASIC 32 determines whether the second authentication information is received from the cartridge 64C. The ASIC 32 returns to S144 if the second authentication information is not received (S144: No), and proceeds to S146 if the second authentication information is received (S144: Yes).

In S146, the ASIC 32 determines whether the first authentication information temporarily stored in the storage section 33 matches the second authentication information received from the cartridge 64C. If both authentication information do not match (S146: No), the ASIC 32 proceeds to S148 because authentication has failed. In S148, the ASIC 32 controls the display panel 39 to display that the replaced cartridge 64C is not a genuine product and that the cartridge needs to be replaced with a genuine product. This achieves a state in which printing cannot be performed with a non-genuine cartridge.

If both authentication information match (S146: Yes), the ASIC 32 proceeds to S150 because authentication has succeeded. In S150, the ASIC 32 moves to a standby mode (a mode of waiting for a print job). The flowchart then ends.

Update Process of Number of Times of Cleaning

Figure 5:
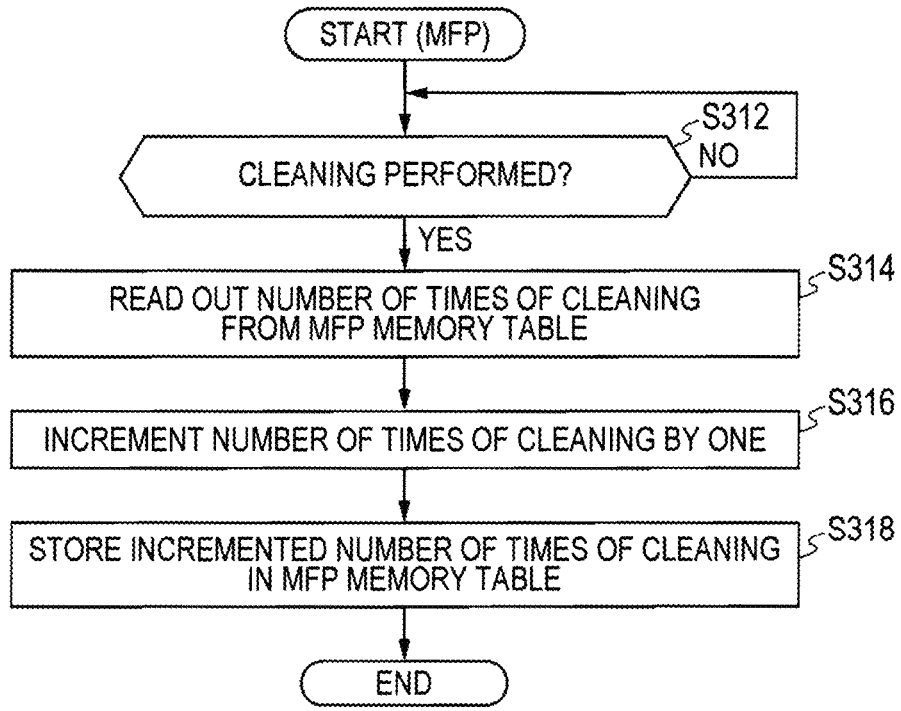
FIG. 5 is a flowchart showing processes of updating a number of times of cleaning.

An update process of the number of times of cleaning 122, executed by the MFP 51, will be described with reference to the flowchart of FIG. 5. In S312, the ASIC 32 determines whether cleaning of the head section is performed. Cleaning is performed upon various triggers such as that a cleaning button is pressed by a user, that a predetermined number of sheets are printed, and the like. The ASIC 32 returns to S312 if cleaning is not performed (S312: No), and proceeds to S314 if cleaning is performed (S312: Yes).

In S314, the ASIC 32 reads out the number of times of cleaning 122 from the MFP memory table TB11. In S316, the ASIC 32 increments the read-out number of times of cleaning 122 by one (1). In S318, the ASIC 32 stores the incremented number of times of cleaning 122 in the MFP memory table TB11 (that is, the ASIC 32 overwrites the existing number of times of cleaning 122). Then the update process ends.

Note that update processes of the cumulative number of printed sheets 123, the cumulative power-on period 124, and the like, included in the history information 120 are similar to the update process of the number of times of cleaning 122. Hence, detailed descriptions are omitted.

Update Process of Ink-Remaining-Amount Information

Figure 6:
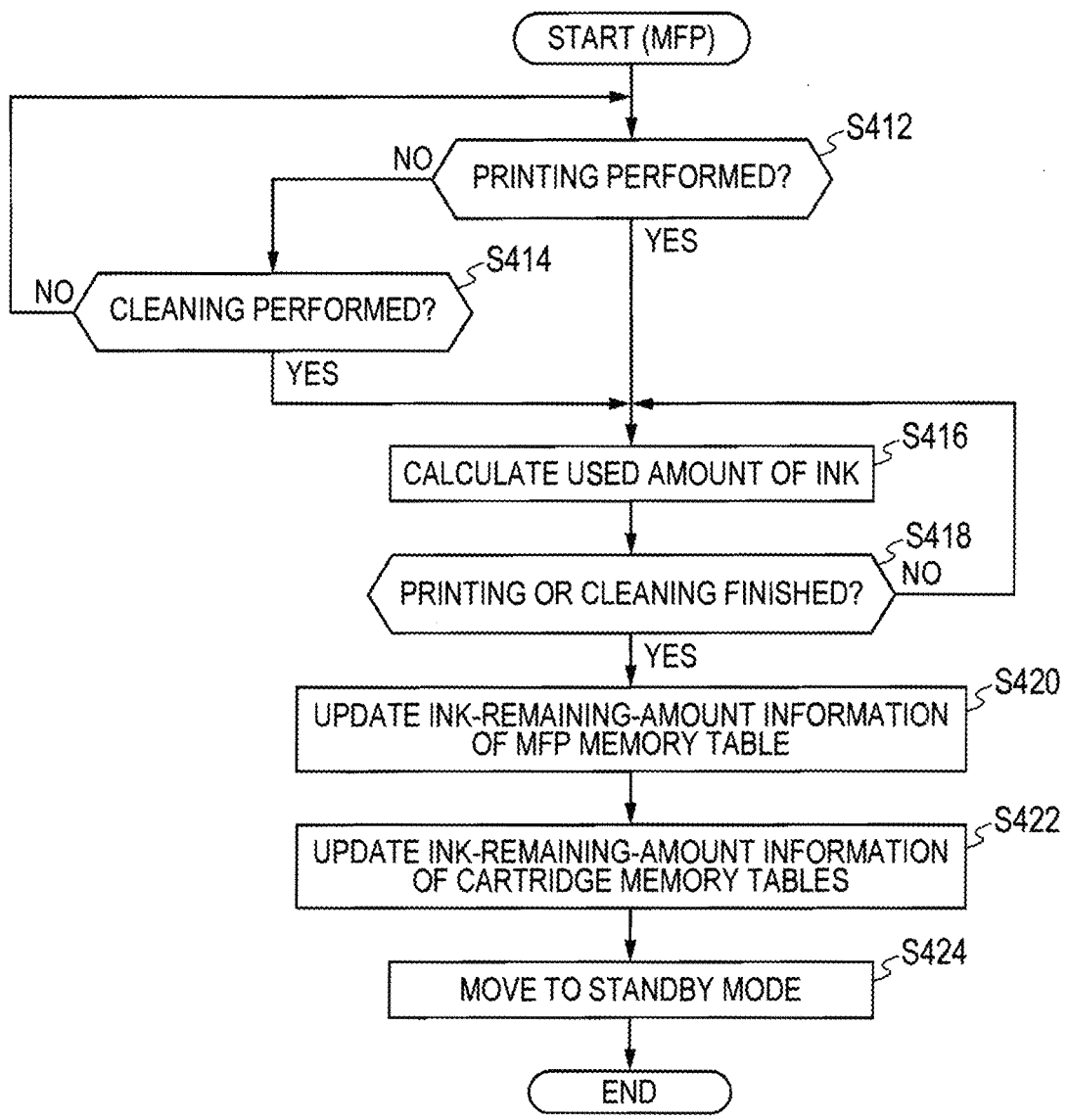
FIG. 6 is a flowchart showing processes of updating ink-remaining-amount information.

An update process of the ink-remaining-amount information 113, executed by the MFP 51, will be described with reference to the flowchart of FIG. 6. In S412, the ASIC 32 determines whether printing is performed by the printer 19. The ASIC 32 proceeds to S416 if printing is performed (S412: Yes), and proceeds to S414 if printing is not performed (S412: No). In S414, the ASIC 32 determines whether cleaning of the head section is performed. The ASIC 32 returns to S412 if cleaning is not performed (S414: No), and proceeds to S416 if cleaning is performed (S414: Yes).

In S416, the ASIC 32 calculates a used amount of ink in a printing process or in a cleaning process for each of the cartridges 64C, 64M, 64Y, and 64K. The used amount of ink can be calculated by counting dots, for example. In S418, the ASIC 32 determines whether printing or cleaning is finished. The ASIC 32 returns to S416 if printing or cleaning is not finished (S418: No), and proceeds to S420 if printing or cleaning is finished (S418: Yes). In S420, the ASIC 32 updates each of the ink-remaining-amount information 113C through 113K of the MFP memory table TB11. In S422, the ASIC 32 updates each of the ink-remaining-amount information 213C through 213K in each of the cartridge memory tables TB21C through TB21K stored in the cartridges 64C through 64K, respectively. In S424, the ASIC 32 moves to the standby mode. Then the processes in the flowchart end.

Advantageous Effects

Advantageous effects of the MFP 51 according to the above-described embodiment will be described. In the MFP 51 of the present embodiment, the usage secret key can be changed automatically in accordance with usage frequency of the MFP 51 by the user (the number of times of cleaning) (S134). With this configuration, it is difficult to determine from outside which of the first secret key K1 through the fourth secret key K4 is to be used. This suppresses a state in which a compatible cartridge manufactured by a non-regular supplier is recognized as a regular cartridge manufactured by a regular supplier, thereby facilitating a normal (appropriate) operation of a function of preventing failure etc. of the MFP 51.

Further, in the MFP 51 according to the present embodiment, the process of selecting the usage secret key (S134) is executed based on a fact that it is detected that a cartridge is mounted (S118: Yes). Thus, the process of selecting the usage secret key (S132 and S134) is skipped until a mount operation of the cartridge is detected. This enables a control that the usage secret key for the cartridge is unchanged (maintained) regardless of a value of usage history (number of times of cleaning) of the MFP 51, until a cartridge is mounted next time. This prevents a situation in which printing etc. is suddenly disabled although the user does not perform an operation of dismounting a cartridge or the like.

Further, in the MFP 51 according to the present embodiment, the process of selecting the usage secret key (S134) is executed for the cartridge for which dismounting and mounting are performed (S120) among the cartridges 64C, 64M, 64Y, and 64K. Thus, the process of individually changing the usage secret key can be executed for each of the plurality of cartridges 64C, 64M, MY, and 64K.

Further, in the MFP 51 according to the present embodiment, if a cartridge is dismounted from the insertion opening and then the dismounted cartridge is again mounted on the insertion opening (that is, the cartridge is not replaced) (S126: Yes), the process of selecting the usage secret key (S134) is not executed depending on another condition (the ink-re-maining-amount information). This enables a control that an unnecessary changing process of the usage secret key is not executed.

Further, in the MFP 51 according to the present embodiment, if a cartridge is dismounted from the insertion opening and then the dismounted cartridge is mounted (S126: Yes), and if the remaining amount of ink in the cartridge is changed (S130: No), then it is determined that there is a possibility that the cartridge is used on another printing device. In this case, too, the process of selecting the usage secret key (S134) is executed, thereby facilitating a normal (appropriate) operation of the function of preventing failure etc. of the printing device.

Modifications

While the invention has been described in detail with reference to the above aspects thereof, it would be apparent to those skilled in the art that various changes and modifications may be made therein without departing from the scope of the claims. In the following descriptions, like parts and components are designated by the same reference numerals to avoid duplicating description In the above-described embodiment, the usage secret key is selected using the number of times of cleaning 122 (S134). However, the usage secret key may be selected in S134 using information relating to a history of usage of the MFP 51 (the numbers of times of mounting cartridge 121C through 121K, the cumulative number of printed sheets 123, and the cumulative power-on period 124). For example, if a secret-key table TB12a shown in FIG. 11 is used, the usage secret key can be selected by determining which range of cumulative-number-of-printed-sheet thresholds 301a through 304a the cumulative number of printed sheets 123 falls within. Further, if a secret-key table TB12b shown in FIG. 12 is used, the usage secret key can be selected by determining which range of cumulative-power-on-period thresholds 301b through 304b the cumulative power-on period 124 falls within.

Further, if a secret-key table TB12c shown in FIG. 13 is used, the usage secret key can be selected by determining which range of number-of-time-of-mounting-cartridge thresholds 301c through 304c each of the numbers of times of mounting cartridge 121C through 121K falls within. In this case, the usage secret key is changed individually for each of the cartridges 64C, 64M, 64Y, and 64K.

In the above-described embodiment, the number of secret keys preliminarily stored in the storage section 33 of the MFP 51 and in the cartridges 64C, 64M, 64Y, and 64K is four (4), which is the first secret key K1 through the fourth secret key K4. However, the number of the secret keys may be less than or equal to three (3) or be larger than or equal to five (5).

In the above-described embodiment, the number of kinds of used ink is four (4), which is cyan, magenta, yellow, and black. However, the number of kinds of used ink may be less than or equal to three (3) or be larger than or equal to five (5). Further, developer accommodated in a cartridge is not limited to ink, but may be another developer such as toner.

In the above-described embodiment, the IC chips 63C, 63M, 63Y, and 63K are contact-type ICs. However, noncontact-type ICs may be used.

What is claimed is:

1. A printing device comprising:
    at least one mount section on which a cartridge storing a plurality of secret keys is configured to be detachably mounted;
    a printing section configured to perform printing on a recording medium with developer accommodated in the cartridge;
    a first memory section configured to store a plurality of secret keys that is identical to the plurality of secret keys stored in the cartridge;
    a second memory section configured to store history information relating to a history of usage of the printing device;
    a secret-key selecting section configured to perform a secret-key selecting operation of selecting, based on the history information, a specific secret key from among the plurality of secret keys stored in the first memory section;
    a first-authentication-information generating section configured to encrypt a random number based on the selected specific secret key, thereby generating first authentication information;
    a third memory section configured to store the first authentication information;
    a transmitting section configured to transmit first identification information and the random number to the cartridge, the first identification information comprising particular information that identifies the specific secret key, the specific secret key being selected by the secret-key selecting section based on the history information;
    a receiving section configured to receive second authentication information from the cartridge, the second authentication information being generated at the cartridge by encrypting the random number transmitted by the transmitting section based on a secret key identified by the first identification information; and an authenticating section configured to compare the first authentication information stored in the third memory section with the second authentication information received by the receiving section, and to authenticate the cartridge if the first authentication information matches the second authentication information.

2. The printing device according to claim 1, further comprising a detecting section configured to detect whether the cartridge is mounted on the at least one mount section, wherein the secret-key selecting section is configured to perform the secret-key selecting operation if the detecting section detects a mount operation of the cartridge and if a predetermined condition is satisfied; and wherein the secret-key selecting section is configured to skip the secret-key selecting operation regardless of the history information until the detecting section detects the mount operation of the cartridge.

3. The printing device according to claim 2, wherein the at least one mount section comprises a plurality of mount sections on which a plurality of cartridges is configured to be detachably mounted; and wherein the secret-key selecting section is configured to perform the secret-key selecting operation for the cartridge for which the mount operation is detected, among the plurality of cartridges mounted on the plurality of mount sections.

4. The printing device according to claim 3, wherein the second memory section is configured to store the history information relating to a history of usage for each of the plurality of cartridges.

5. The printing device according to claim 1, further comprising a fourth memory section configured to receive second identification information from the cartridge mounted on the at least one mount section and to store the second identification information therein, the second identification information being information for identifying each cartridge, wherein the secret-key selecting section is configured to perform the secret-key selecting operation if the second identification information stored in the fourth memory section differs from the second identification information received from the cartridge mounted on the at least one mount section.

6. The printing device according to claim 5, further comprising a fifth memory section configured to receive remaining-amount information from the cartridge mounted on the at least one mount section and to store the remaining-amount information therein, the remaining-amount information relating to a remaining amount of developer accommodated in the cartridge, wherein the secret-key selecting section is configured to perform the secret-key selecting operation, if the second identification information stored in the fourth memory section matches the second identification information received from the cartridge mounted on the at least one mount section and if the remaining-amount information stored in the fifth memory section differs from the remaining-amount information received from the cartridge mounted on the at least one mount section.

7. The printing device according to claim 6, wherein the secret-key selecting section is configured to skip the secret-key selecting operation, if the second identification information stored in the fourth memory section matches the second identification information received from the cartridge mounted on the at least one mount section and if the remaining-amount information stored in the fifth memory section matches the remaining-amount information received from the cartridge mounted on the at least one mount section.

8. The printing device according to claim 1, wherein the history information is a count value of a number of times of predetermined operations that are performed in the printing device; and wherein the secret-key selecting section is configured to select a different specific secret key from among the plurality of secret keys if the count value exceeds at least one predetermined threshold, the different specific secret key being different from the specific secret key that is used until that time.

9. The printing device according to claim 8, wherein the history information is a count value of at least one of a number of times of cleaning that is performed in the printing device, a number of times of mounting the cartridge onto the at least one mount section, a number of sheets that are printed in the printing device, and an operating period of the printing device.

10. A method of controlling a printing device including at least one mount section on which a cartridge storing a plurality of secret keys is configured to be detachably mounted, a printing section configured to perform printing on a recording medium with developer accommodated in the cartridge, and a first memory section storing a plurality of secret keys that is identical to the plurality of secret keys stored in the cartridge, the method comprising:

storing history information in a second memory section, the history information relating to a history of usage of a printing device;

performing a secret-key selecting operation of selecting, based on the history information, a specific secret key from among the plurality of secret keys stored in the first memory section;

encrypting a random number based on the selected specific secret key, thereby generating first authentication information;

storing the first authentication information in a third memory section;

transmitting first identification information and the random number to the cartridge, the first identification information comprising particular information that identifies the specific secret key, the specific secret key being selected in the secret-key selecting operation based on the history information;

receiving second authentication information from the cartridge, the second authentication information being generated at the cartridge by encrypting the random number transmitted in the transmitting step based on a secret key identified by the first identification information; and comparing the first authentication information stored in the third memory section with the second authentication information received in the receiving step, and authenticating the cartridge if the first authentication information matches the second authentication information.

11. The method according to claim 10, wherein the printing device further includes a detecting section configured to detect whether the cartridge is mounted on the at least one mount section; and wherein the step of performing a secret-key selecting operation comprises:

performing the secret-key selecting operation if the detecting section detects a mount operation of the cartridge and if a predetermined condition is satisfied; and skipping the secret-key selecting operation regardless of the history information until the detecting section detects the mount operation of the cartridge.

12. The method according to claim 11, wherein the at least one mount section includes a plurality of mount sections on which a plurality of cartridges is configured to be detachably mounted; and
wherein the step of performing a secret-key selecting operation further comprises performing the secret-key selecting operation for the cartridge for which the mount operation is detected, among the plurality of cartridges mounted on the plurality of mount sections.

13. The method according to claim 12, wherein the step of storing history information comprises storing, in the second memory section, history information relating to a history of usage for each of the plurality of cartridges.

14. The method according to claim 10, further comprising receiving second identification information from the cartridge mounted on the at least one mount section and storing the second identification information in a fourth memory section, the second identification information being information for identifying each cartridge,
wherein the step of performing a secret-key selecting operation comprises performing the secret-key selecting operation if the second identification information stored in the fourth memory section differs from the second identification information received from the cartridge mounted on the at least one mount section.

15. The method according to claim 14, further comprising receiving remaining-amount information from the cartridge mounted on the at least one mount section and storing the remaining-amount information in a fifth memory section, the remaining-amount information relating to a remaining amount of developer accommodated in the cartridge,
wherein the step of performing a secret-key selecting operation further comprises performing the secret-key selecting operation if the second identification information stored in the fourth memory section matches the second identification information received from the cartridge mounted on the at least one mount section and if the remaining-amount information stored in the fifth memory section differs from the remaining-amount information received from the cartridge mounted on the at least one mount section.

16. The method according to claim 15, wherein the step of performing a secret-key selecting operation further comprises skipping the secret-key selecting operation if the second identification information stored in the fourth memory section matches the second identification information received from the cartridge mounted on the at least one mount section and if the remaining-amount information stored in the fifth memory section matches the remaining-amount information received from the cartridge mounted on the at least one mount section.

17. The method according to claim 10, wherein the history information is a count value of a number of times of predetermined operations that are performed in the printing device; and wherein the step of performing a secret-key selecting operation comprises selecting a different specific secret key from among the plurality of secret keys if the count value exceeds at least one predetermined threshold, the different specific secret key being different from the specific secret key that is used until that time.

18. The method according to claim 17, wherein the history information is a count value of at least one of a number of times of cleaning that is performed in the printing device, a number of times of mounting the cartridge onto the at least one mount section, a number of sheets that are printed in the printing device, and an operating period of the printing device.

19. A printing device comprising:
at least one mount section on which a cartridge storing a plurality of secret keys is configured to be detachably mounted;
a printing section configured to perform printing on a recording medium with developer accommodated in the cartridge;
a first memory section configured to store a plurality of secret keys that is identical to the plurality of secret keys stored in the cartridge;
a second memory section configured to store history information relating to a history of usage of the printing device;
a third memory section configured to store first authentication information; and
a processor configured to:
perform a secret-key selecting operation of selecting, based on the history information, a specific secret key from among the plurality of secret keys stored in the first memory section;
encrypt a random number based on the selected specific secret key, thereby generating the first authentication information;
transmit first identification information and the random number to the cartridge, the first identification information comprising particular information that identifies the specific secret key, the specific secret key being selected in the secret-key selecting operation based on the history information;
receive second authentication information from the cartridge, the second authentication information being generated at the cartridge by encrypting the transmitted random number based on a secret key identified by the transmitted first identification information;
compare the first authentication information stored in the third memory section with the second authentication information received from the cartridge; and
authenticate the cartridge if the first authentication information matches the second authentication information.

* * * * *